US012737077B2

(12) United States Patent
Asakura et al.

(10) Patent No.: US 12,737,077 B2
(45) **Date of Patent: *Sep. 15, 2026**

(54) POSITION DETECTION APPARATUS CONFIGURED TO DETECT THE POSITIONS OF MULTIPLE POSITION INDICATORS, AND POSITION DETECTION METHOD

(71) Applicant: Wacom Co., Ltd., Saitama (JP)

(72) Inventors: Tomo Asakura, Saitama (JP); Masamitsu Ito, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/172,525

(22) Filed: Apr. 7, 2025

(65) Prior Publication Data

US 2025/0258566 A1 Aug. 14, 2025

Related U.S. Application Data

(63) Continuation of application No. 18/178,432, filed on Mar. 3, 2023, now Pat. No. 12,293,038, which is a (Continued)

(30) Foreign Application Priority Data

Jan. 4, 2019 (JP) ................................ 2019-000251

(51) Int. Cl.
*G06F 3/041* (2006.01)
*G06F 3/039* (2013.01)

(52) U.S. Cl.
CPC ...... *G06F 3/041661* (2019.05); *G06F 3/0393* (2019.05)

(58) Field of Classification Search
None
See application file for complete search history.

(56) References Cited

U.S. PATENT DOCUMENTS

| | | | |
|---|---|---|---|
| 5,466,896 A | 11/1995 | Murakami et al. | |
| 5,691,511 A | 11/1997 | Matsushima et al. | |

(Continued)

FOREIGN PATENT DOCUMENTS

| | | | |
|---|---|---|---|
| EP | 0967566 A2 * | 12/1999 | ............. G06F 3/046 |
| EP | 1413975 A1 | 4/2004 | |

(Continued)

OTHER PUBLICATIONS

International Search Report dated Feb. 18, 2020, for the corresponding International Patent Application No. PCT/JP2019/045177. (1 page).

*Primary Examiner* — Kirk W Hermann
(74) *Attorney, Agent, or Firm* — Seed Intellectual Property Law Group LLP

(57) ABSTRACT

A position detection apparatus includes a sensor, and a controller that detects a position of a first position indicator and a position of a second position indicator through the sensor. The controller continues detecting the position of the first position indicator and halts detecting the position of the second position indicator after a state in which the positions of the first position indicator and the second position indicator are not detected changes to a state in which the position of the first position indicator is detected, and continues both detecting the position of the second position indicator and detecting the position of the first position indicator after the state in which the positions of the first position indicator and the second position indicator are not detected changes to a state in which the position of the second position indicator is detected.

10 Claims, 12 Drawing Sheets

Related U.S. Application Data continuation of application No. 17/343,561, filed on Jun. 9, 2021, now Pat. No. 11,599,220, which is a continuation of application No. PCT/JP2019/045177, filed on Nov. 19, 2019.

(56) References Cited

U.S. PATENT DOCUMENTS

| | | | | |
|---|---|---|---|---|
| 6,239,789 | B1 * | 5/2001 | Sekizawa | G06F 3/046 345/173 |
| 2011/0219892 | A1 * | 9/2011 | Fukushima | G06F 3/0416 73/865.4 |
| 2016/0162102 | A1 * | 6/2016 | Shahparnia | G06F 1/3215 345/174 |
| 2016/0282965 | A1 * | 9/2016 | Jensen | G06F 3/04162 |
| 2017/0308186 | A1 | 10/2017 | Yamamoto | |
| 2018/0004324 | A1 | 1/2018 | Park | |

FOREIGN PATENT DOCUMENTS

| | | | |
|---|---|---|---|
| JP | H086700 | A | 1/1996 |
| JP | H0869350 | A | 3/1996 |
| JP | H09138730 | A | 5/1997 |
| JP | 3225716 | B2 | 11/2001 |
| JP | 2015001788 | A | 1/2015 |

* cited by examiner

HOST PROCESSOR
A/D
S/H
LPF
DETECTION CIRCUIT
2
3
4
10
LC
20
21
22
23
24
25
26
27
28
29
30
40
X
Y
$Y_1$
$Y_2$
$Y_n$
$X_1$
$X_2$
$X_m$

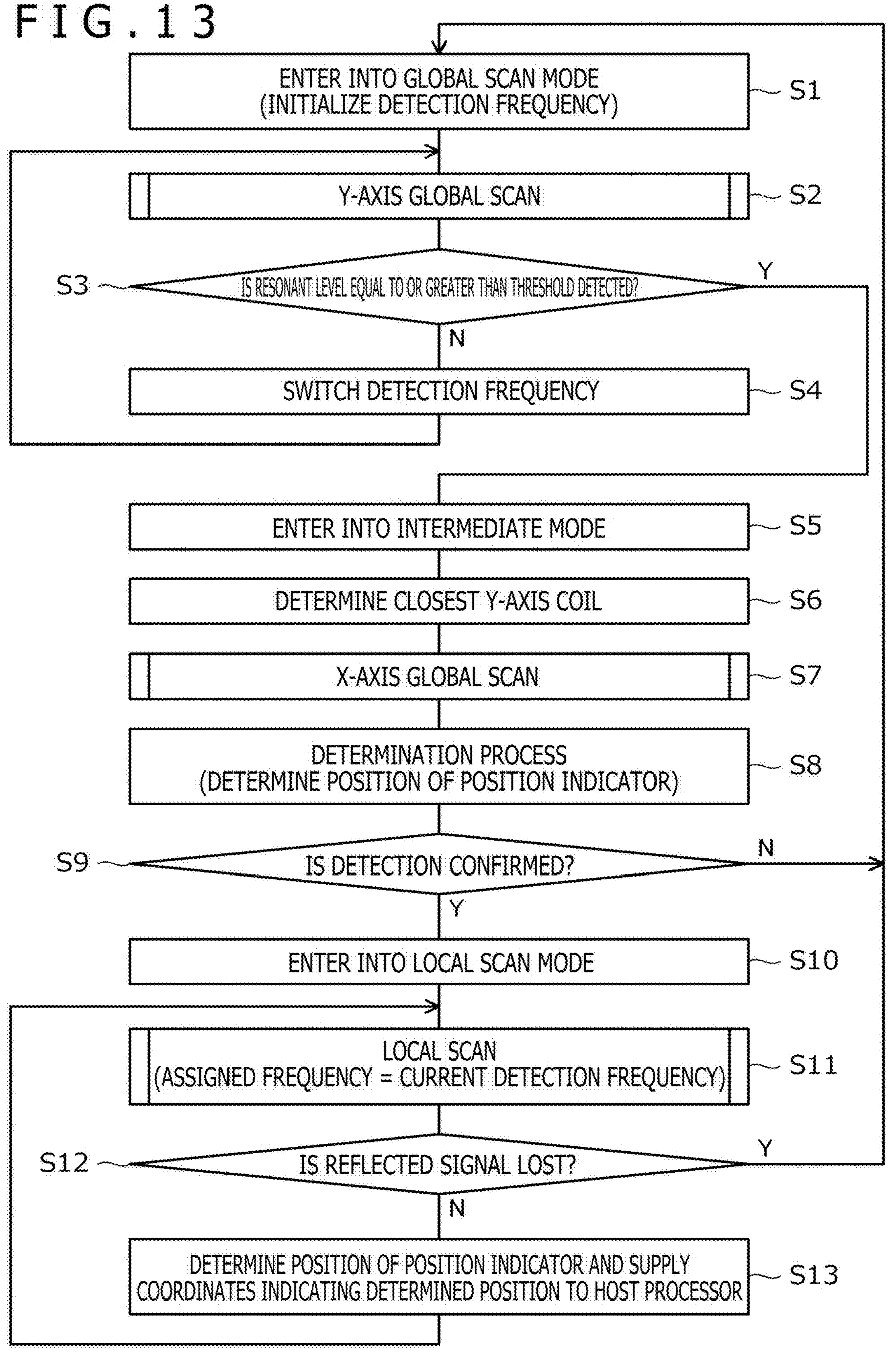
FIG. 13
ENTER INTO GLOBAL SCAN MODE
(INITIALIZE DETECTION FREQUENCY)
S1
Y-AXIS GLOBAL SCAN
S2
S3
IS RESONANT LEVEL EQUAL TO OR GREATER THAN THRESHOLD DETECTED?
Y
N
SWITCH DETECTION FREQUENCY
S4
ENTER INTO INTERMEDIATE MODE
S5
DETERMINE CLOSEST Y-AXIS COIL
S6
X-AXIS GLOBAL SCAN
S7
DETERMINATION PROCESS
(DETERMINE POSITION OF POSITION INDICATOR)
S8
S9
IS DETECTION CONFIRMED?
N
Y
ENTER INTO LOCAL SCAN MODE
S10
LOCAL SCAN
(ASSIGNED FREQUENCY = CURRENT DETECTION FREQUENCY)
S11
S12
IS REFLECTED SIGNAL LOST?
Y
N
DETERMINE POSITION OF POSITION INDICATOR AND SUPPLY
COORDINATES INDICATING DETERMINED POSITION TO HOST PROCESSOR
S13

POSITION DETECTION APPARATUS CONFIGURED TO DETECT THE POSITIONS OF MULTIPLE POSITION INDICATORS, AND POSITION DETECTION METHOD

BACKGROUND

Technical Field

The present disclosure relates a position detection apparatus and a position detection method, and particularly, to a position detection apparatus and a position detection method for appropriately detecting a position indicated by each of a plurality of position indicators.

Background Art

An electromagnetic-induction input apparatus is known as an input device of an electronic device, such as a tablet terminal and a smartphone. This type of input apparatus includes, for example, a position indicator formed in a pen shape and a position detection apparatus including a planar input surface. The user holds the position indicator by hand and performs an input operation by sliding the position indicator on the input surface as if the user writes words or pictures on paper.

The position indicator includes a resonant circuit including an inductor and a capacitor. The position detection apparatus includes a plurality of loop coils provided in the input surface. Position detection of the position indicator performed by the position detection apparatus will be simply described. The position detection apparatus first causes one of the loop coils to generate a magnetic field. Consequently, induced power is generated in the inductor of the position indicator, and the capacitor is charged. Subsequently, once the position detection apparatus causes the magnetic field to disappear, the power charged in the capacitor is used to transmit a reflected signal from the position indicator. The position detection apparatus determines the reception strength of the transmitted reflected signal at each loop coil to detect the position of the position indicator in the input surface.

A position indicator provided with resonant circuits at both ends is disclosed in Japanese Patent Laid-Open No. H8-69350. The phases of the reflected signals of the signal from the position detection apparatus vary in the resonant circuits at both ends, and therefore, the position detection apparatus can distinguish and detect the reflected signals. As a result, one end can be handled as a pen, and the other end can be handled as an eraser, for example. Therefore, the user can use the position indicator as if the user is using a pencil with eraser.

In typical stationery, not only erasers provided at back ends of pencils, but also erasers separated from pencils are often used. Therefore, in relation to the position indicator, the inventor of the present specification is also examining to provide a position indicator with eraser function and a position indicator with pen function as separate devices. In this case, an example of a position detection method for distinguishing and detecting the positions indicated by the position indicators includes the following method. Different resonant frequencies are allocated to the position indicators, and the resonant frequencies are first used to perform global scans (scans of the entire sensors) in a time-division manner. When the position indicated by one of the position indicators is detected in the global scan, the global scan is shifted to a local scan of the position indicated by the position indicator (scan of a neighborhood area of the detected position in the sensor). Such a position detection method can be adopted.

However, when such a position detection method is adopted, the position indicated by another position indicator cannot be detected after the position indicated by a position indicator is detected. Therefore, there is a demand for allowing to detect the position indicated by another position indicator even when the position indicated by a position indicator is detected. For example, even in a case where the position indicated by the position indicator with eraser function is detected, there is a demand for allowing to detect the position indicated by the position indicator with pen function when the position indicator that is a pen approaches.

BRIEF SUMMARY

Therefore, an object of the present disclosure is to provide a position detection apparatus and a position detection method that can appropriately detect a position indicated by each of a plurality of position indicators according to the situation.

The present disclosure provides a position detection apparatus including a sensor, and a controller which, in operation, detects a position indicated by a first position indicator and a position indicated by a second position indicator through the sensor, in which the controller continues a process of detecting the position indicated by the first position indicator and halts a process of detecting the position indicated by the second position indicator after a state in which the position indicated by the first position indicator and the position indicated by the second position indicator are not detected changes to a state in which the position indicated by the first position indicator is detected, and continues both the process of detecting the position indicated by the second position indicator and the detection of the first position after the state in which the position indicated by the first position indicator and the position indicated by the second position indicator are not detected changes a state in which the position indicated by the second position indicator is detected.

The present disclosure provides a position detection method that includes: performing a process of detecting a position indicated by a first position indicator through a sensor; performing a process of detecting a position indicated by a second position indicator through the sensor; continuing the process of detecting the position indicated by the first position indicator and halting the process of detecting the position indicated by second position indicator after a state in which the position indicated by the first position indicator and the position indicated by the second position indicator are not detected changes to a state in which the position indicated by the first position indicator is detected, and continuing both the process of detecting the position indicated by the second position indicator and the process of detecting the position indicated by the first position indicator after the state in which the position indicated by the first position indicator and the position indicated by the second position indicator are not detected changes to a state in which the position indicated by the second position indicator is detected.

According to the present disclosure, the position indicated by each of a plurality of position indicators can be appropriately detected according to the situation.

BRIEF DESCRIPTION OF THE DRAWINGS

FIG. 13 is a process flow chart illustrating a specific example of a position detection process of the present disclosure.

DETAILED DESCRIPTION

Embodiments of the present disclosure will now be described in detail with reference to the attached drawings.

Figure 1:
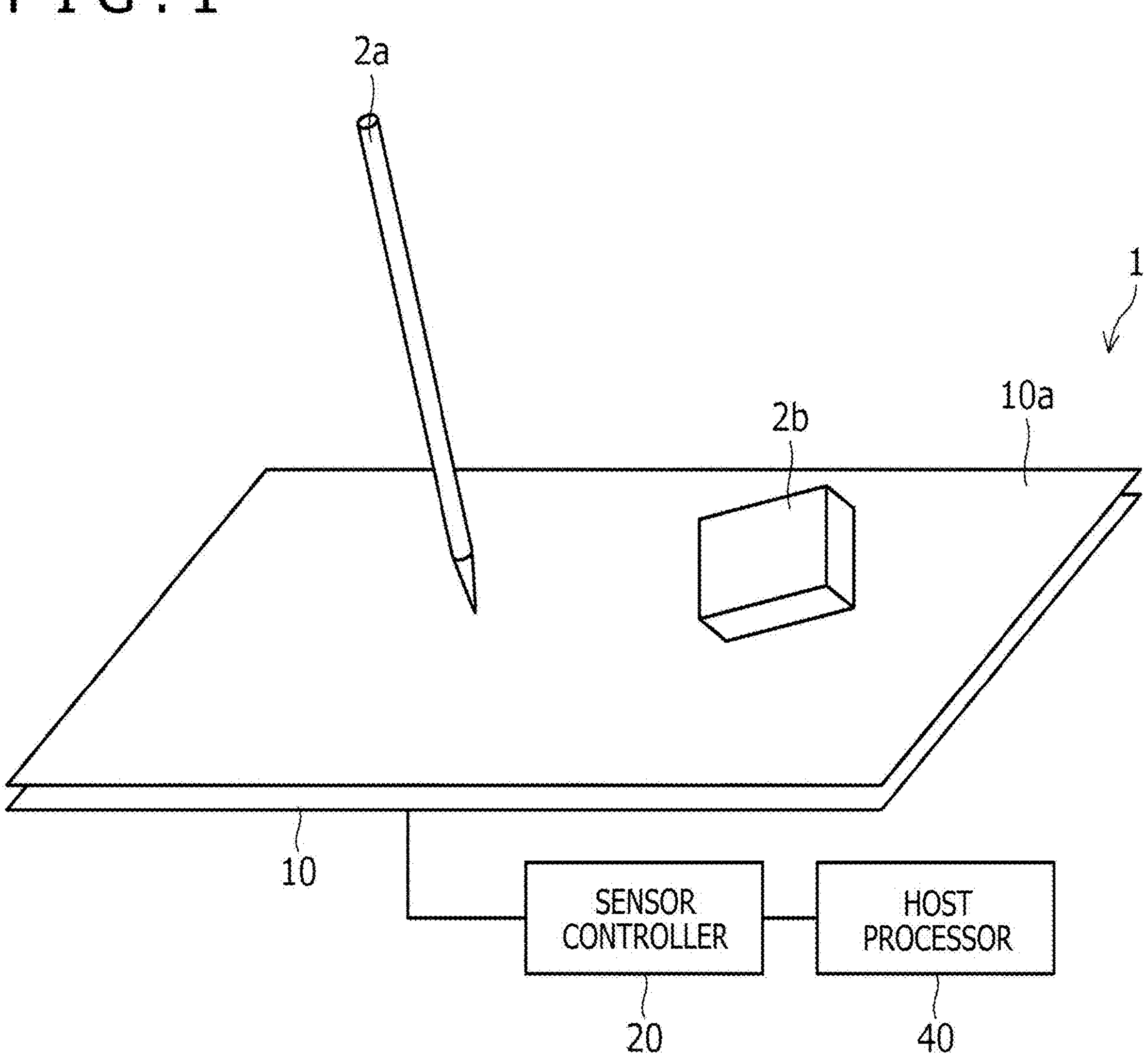
FIG. 1 depicts an appearance of a position detection apparatus and position indicators according to a first embodiment of the present disclosure.

FIG. 1 depicts an appearance of a position detection apparatus 1 and position indicators 2*a* and 2*b* according to a first embodiment of the present disclosure. The position detection apparatus 1 is a computer, such as a tablet terminal, including an input surface 10*a*, and as illustrated in FIG. 1, the position detection apparatus 1 includes a sensor 10, a sensor controller 20, and a host processor 40. Among these, the sensor 10 and the sensor controller 20 will be described in detail later. The host processor 40 is a central processing unit of the position detection apparatus 1 that is a computer. The host processor 40 executes instructions stored in a memory in order to perform a process of generating stroke data based on coordinates input from the sensor controller 20, a process of storing the generated stroke data in a storage apparatus, a process of transmitting the generated stroke data to another computer, a process of rendering and displaying the generated stroke data on a display apparatus, etc.

Each of the position indicators 2*a* and 2*b* is an apparatus that functions as an input apparatus for the position detection apparatus 1. As illustrated in FIG. 1, the position indicator 2*a* with pen function is formed in a pen shape, and the position indicator 2*b* with eraser function is formed in an eraser shape. Although described in detail later, the position detection apparatus 1 can distinguish and detect the position indicators 2*a* and 2*b* based on the difference in resonant frequency. In generating the stroke data, the position detection apparatus 1 handles the position indicator 2*a* as a pen and handles the position indicator 2*b* as an eraser. In the following description, the position indicators 2*a* and 2*b* (and a position indicator 2*c* described in a second embodiment) will be collectively called a position indicator 2 in some cases.

Figure 2:
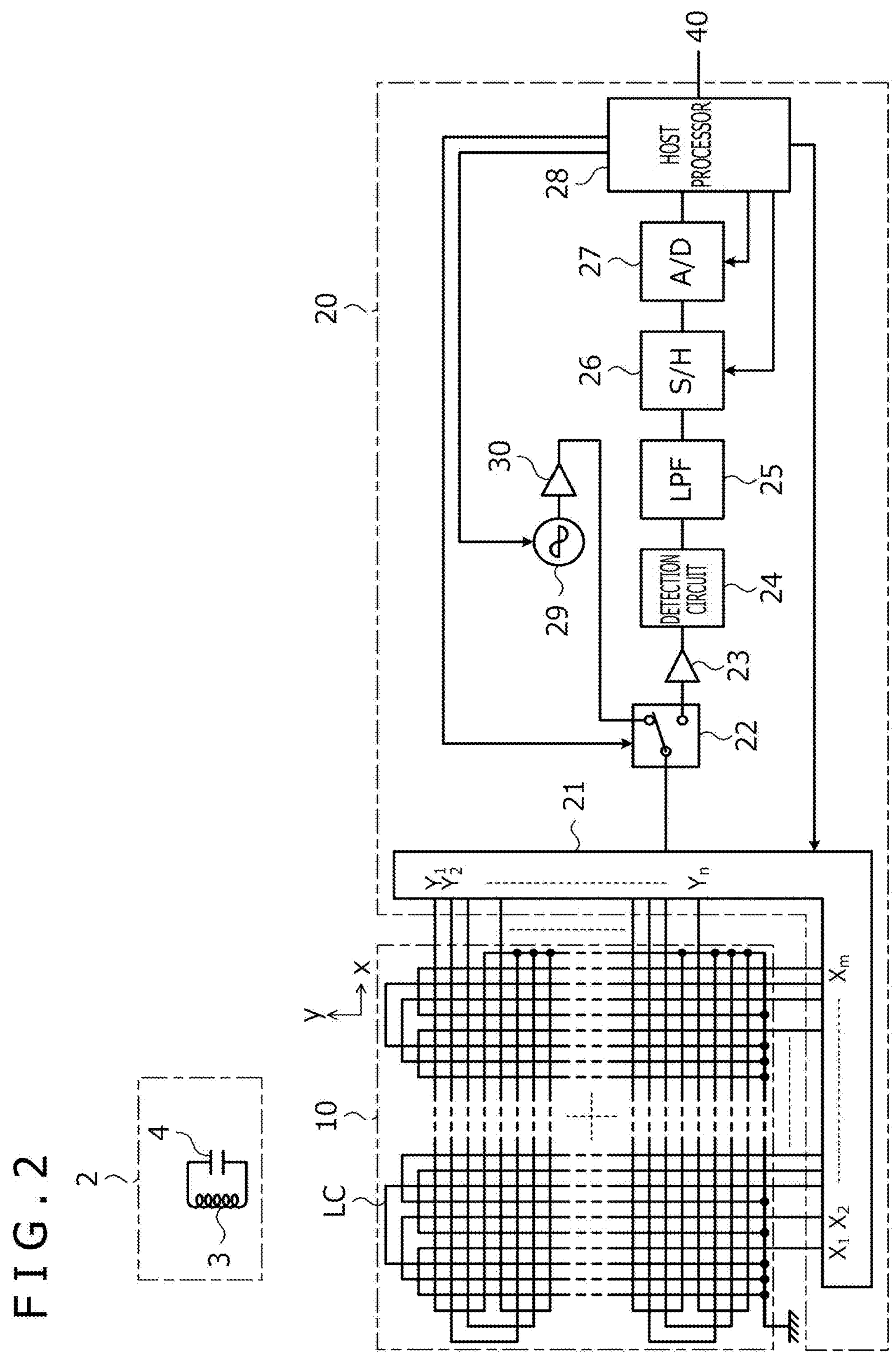
FIG. 2 depicts an internal configuration of a position indicator, a sensor, and a sensor controller.

FIG. 2 depicts an internal configuration of the position indicator 2, the sensor 10, and the sensor controller 20. The position indicator 2 will be described first. The position indicator 2 includes an LC resonant circuit including an inductor 3 and a capacitor 4. The inductance of the inductor 3 and the capacitance of the capacitor 4 are set so that the resonant frequency of the LC resonant circuit varies in each type of position indicator 2. The inductor 3 plays a role of generating an induced voltage according to a magnetic field supplied from the sensor 10 to charge the capacitor 4. The inductor 3 after the stop of the supply of magnetic field from the sensor 10 also plays a role of using the charge accumulated in the capacitor 4 to transmit a reflected signal to the position detection apparatus 1.

The sensor 10 includes a plurality of loop coils LC arranged in a rectangular planar area as illustrated in FIG. 2. One end of each loop coil LC is grounded, and the other end is connected to the sensor controller 20. FIG. 2 illustrates an example of the plurality of loop coils LC including m X-axis loop coils $X_1$ to $X_m$ extending in an illustrated y-direction and n Y-axis loop coils $Y_1$ to $Y_n$ extending in an x-direction orthogonal to the y-direction. Each of m and n is, for example, 40.

The sensor controller 20 detects a position (first position) on the input surface 10*a* indicated by the position indicator 2*a* and a position (second position) on the input surface 10*a* indicated by the position indicator 2*b* through the sensor 10. The sensor controller 20 includes a selection circuit 21, a switch circuit 22, an amplifier 23, a detection circuit 24, a low-pass filter (LPF) 25, a sample and hold circuit (S/H) 26, an analog-to-digital conversion circuit (A/D) 27, a controller 28, an oscillator 29, and a current driver 30 as illustrated in FIG. 2.

The other end of each loop coil LC is connected to the selection circuit 21. The selection circuit 21 plays a role of selecting one or a plurality of loop coils LC according to the control from the controller 28 and connecting the selected loop coils LC to the switch circuit 22.

The switch circuit 22 is a switch including one common terminal and two selection terminals, and the switch circuit 22 can switch the selection terminal to be connected to the common terminal according to the control from the controller 28. The selection circuit 21 is connected to the common terminal of the switch circuit 22. An input end of the amplifier 23 is connected to one of the selection terminals, and an output end of the current driver 30 is connected to the other selection terminal.

The amplifier 23 is a circuit that amplifies a voltage signal supplied from the selection circuit 21 through the switch circuit 22 and that outputs the voltage signal to the detection circuit 24. The detection circuit 24 is a circuit that detects envelopes of a voltage signal output from the amplifier 23 to generate an envelope signal and that outputs the envelope signal to the low-pass filter 25. The low-pass filter 25 plays a role of removing high frequency components from the envelope signal generated by the detection circuit 24. The sample and hold circuit 26 is configured to perform, at a predetermined time interval, a sampling operation and a holding operation of the envelope signal from which the high frequency components are removed by the low-pass filter 25. The analog-to-digital conversion circuit 27 applies analog-to-digital conversion to the signal held by the sample and hold circuit 26 to thereby generate a digital signal and outputs the digital signal to the controller 28.

The controller 28 is a processor that operates according to a program stored in a storage apparatus, and the controller 28 is connected to the host processor 40 illustrated in FIG. 1. The controller 28 controls the selection circuit 21, the switch circuit 22, the sample and hold circuit 26, the analog-to-digital conversion circuit 27, and the oscillator 29. The controller 28 is also configured to perform, for example, a process of detecting the position of the position indicator 2 based on the digital signal supplied from the analog-to-digital conversion circuit 27 and outputting coordinates representing the detected position to the host processor 40 in association with the type of position indicator 2.

Figure 3A:
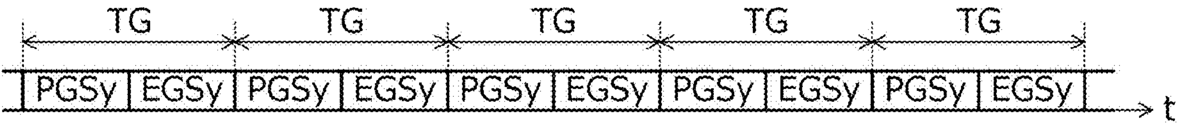
FIGS. 3A and 3B depict an outline of a position detection process carried out by a controller according to the first embodiment of the present disclosure.
Figure 3B:
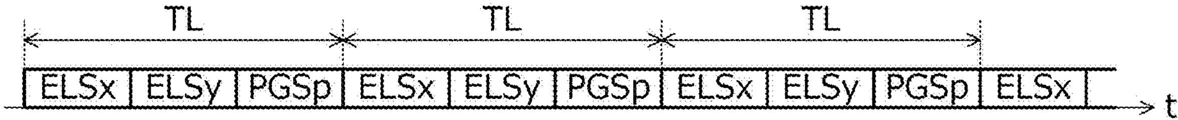

FIGS. 3A and 3B depict an outline of a position detection process carried out by the controller 28 according to the present embodiment. FIG. 3A illustrates a global scan mode of performing a global scan for scanning the entire sensor 10 to detect the position indicated by each position indicator 2, and FIG. 3B illustrates a local scan mode of performing a local scan for scanning a neighborhood area of a detected position in the sensor 10. Although described in detail later, FIG. 3B illustrates a local scan mode for the detection of the position indicated by the position indicator 2*b* with eraser function. Between the global scan mode and the local scan mode, there is an intermediate mode for confirming the position detected in the global scan mode.

After entering into the global scan mode, the controller 28 is configured to perform the global scan of each position indicator 2 in a time-division manner at a frequency of once per time period TG. "PGS" illustrated in FIGS. 3A and 3B represents a global scan (GlobalScan) of the position indicator 2*a* with pen (Pen) function, and "EGS" represents a global scan (GlobalScan) of the position indicator 2*b* with eraser (Eraser) function.

The time period TG is set to, for example, 0.125 seconds (8 Hz). The controller 28 is configured to divide the global scan of the individual position indicators 2 into a Y-axis global scan that is a scan of the Y-axis loop coils LC and an X-axis global scan that is a scan of the X-axis loop coils LC. In the global scan mode, the controller 28 is configured to repeatedly perform the Y-axis global scans of the position indicators 2 in a time-division manner. Note that in FIGS. 3A and 3B, reference sign "y" added to the end of each of "PGS" and "EGS" represents a Y-axis global scan. When a position indicator 2 is detected in one of the Y-axis global scans, the controller 28 shifts to the intermediate mode for the position indicator 2.

The order of position indicators that perform the Y-axis global scan is determined in advance in the global scan mode of the present embodiment, and when the controller 28 enters into the global scan mode from another mode, the Y-axis global scan of each position indicator is started according to the predetermined order. In the following description, the position indicator for which the Y-axis global scan is performed earlier in the global scan mode will be referred to as a "priority position indicator," and the position indicator for which the Y-axis global scan is performed later will be referred to as a "non-priority position indicator." As illustrated in FIG. 3A, the Y-axis global scan is performed in the order of the position indicator 2*a* and the position indicator 2*b*. Therefore, the position indicator 2*a* with pen function is the priority position indicator, and the position indicator 2*b* with eraser function is the non-priority position indicator in the present embodiment.

The intermediate mode will be described. Once the controller 28 enters into the intermediate mode, the controller 28 performs the X-axis global scan for the position indicator 2 detected in the global scan mode and performs a determination process for confirming the detection. The determination process is a process of determining whether the detection results of the Y-axis global scan and the X-axis global scan satisfy a predetermined detection condition. Although the details will be described in detail later, an example of the predetermined detection condition includes that the reception strength distribution of the reflected signals detected in the Y-axis global scan and the X-axis global scan has a predetermined shape. When the controller 28 confirms the detection of the position as a result of the determination process, the controller 28 shifts to the local scan mode for the position indicator 2 for which the detection of the position is confirmed. On the other hand, when the controller 28 does not confirm the detection of the position, the controller 28 returns to the global scan mode.

After entering into the local scan mode, the controller 28 performs the local scan for the target position indicator at a frequency of once per time period TL as illustrated in FIG. 3B. TL is, for example, approximately 0.0075 seconds (133 Hz) and is set to a value smaller than the time period TG. This is for generating the stroke data at a high accuracy. Note that "ELS" illustrated in FIG. 3B represents a local scan (LocalScan) of the position indicator 2*b* with eraser (Eraser) function. Reference signs "x" and "y" added to the ends of "ELS" represent a scan of the X-axis loop coils LC and a scan of the Y-axis loop coils LC, respectively. As illustrated in FIG. 3B, the controller 28 is configured to sequentially carry out the scan of the X-axis loop coils LC and the scan of the Y-axis loop coils LC in one local scan.

The controller 28 performs the local scan for the target position indicator at a frequency of once per time period TL. On the other hand, the controller 28 performs the global scan for the other position indicator 2. In an example of the present embodiment, the global scan performed for the other position indicator 2 is divided and performed. That is, the controller 28 is configured to perform a global scan of part of the other position indicator 2 (hereinafter, referred to as a partial global scan). The partial global scan is part of the corresponding global scan, and for example, the scan is performed for two or three loop coils LC. Note that one or both of the Y-axis loop coils LC and the X-axis loop coils LC may be included in the loop coils LC to be scanned in the partial global scan. The specific number of loop coils LC that can be scanned in the partial global scan is determined by, for example, taking into account the time length of the partial global scan. In the present embodiment, the controller 28 preferentially handles the position indicator 2*a* with pen function. Therefore, when the controller 28 is in the local scan mode for the position indicator 2*b* with eraser function, the controller 28 alternately performs the local scan of the position indicator 2*b* and the partial global scan of the position indicator 2*a*. Note that "PGSp" illustrated in FIG. 3B represents the partial global scan of the position indicator 2*a* with pen function. In this way, after the controller 28 detects the position of the position indicator 2*b* in a state in which the position of the position indicator 2*a* and the position of the position indicator 2*b* are not detected, the controller 28 continues to detect both of the position of the position indicator 2*a* and the position of the position indicator 2*b*.

In the present embodiment, the controller 28 does not carry out the partial global scan of the position indicator 2*b* with eraser function when the controller 28 is in the local scan mode for the position indicator 2*a* with pen function. That is, after the state in which the position of the position indicator 2*a* and the position of the position indicator 2*b* are not detected is shifted to a state in which the position of the position indicator 2*a* is detected, the controller 28 continues the detection of the position of the position indicator 2*a* and halts the detection of the position of the position indicator 2*b*. This is a configuration based on an example of the actual situation of the user, in which the user does not input the position by using the position indicator 2*b* with eraser function while inputting the position by using the position indicator 2*a* with pen function. Depending on the actual situation of the user, it is obvious that the partial global scan of the position indicator 2*b* may be performed when the controller 28 is in the local scan mode for the position indicator 2*a*.

When the position indicator 2*a* is detected in the partial global scan, the controller 28 returns to the global scan mode. The position indicator 2*a* is detected in the global scan, and therefore, the controller 28 shifts to the local scan mode for the position indicator 2*a* after the end of the global scan and continues the position detection of the position indicator 2*a*.

FIG. 2 will be further described. The oscillator 29 is a circuit that can generate an AC (alternating current) signal at an arbitrary frequency (hereinafter, referred to as a "detection signal"). The frequency of the detection signal (hereinafter, referred to as a "detection frequency") generated by the oscillator 29 is controlled by the controller 28. The current driver 30 converts the detection signal output from the oscillator 29 into a current signal and supplies the current signal to the switch circuit 22.

A specific method performed by the controller 28 to detect the position indicated by the position indicator 2 will now be described in more detail with reference to a process flow performed by the controller 28.

FIG. 13 is a process flow chart illustrating a specific example of the position detection process performed by the controller 28.

As illustrated in FIG. 13, the controller 28 first enters into the global scan mode (S1). The controller 28 initializes the detection frequency at the entry into the global scan mode. The detection frequency initialized in this way is the resonant frequency of the position indicator 2*a* in the present embodiment (see FIG. 3A).

After entering into the global scan mode, the controller 28 performs the Y-axis global scan (S2).

Figure 6A:
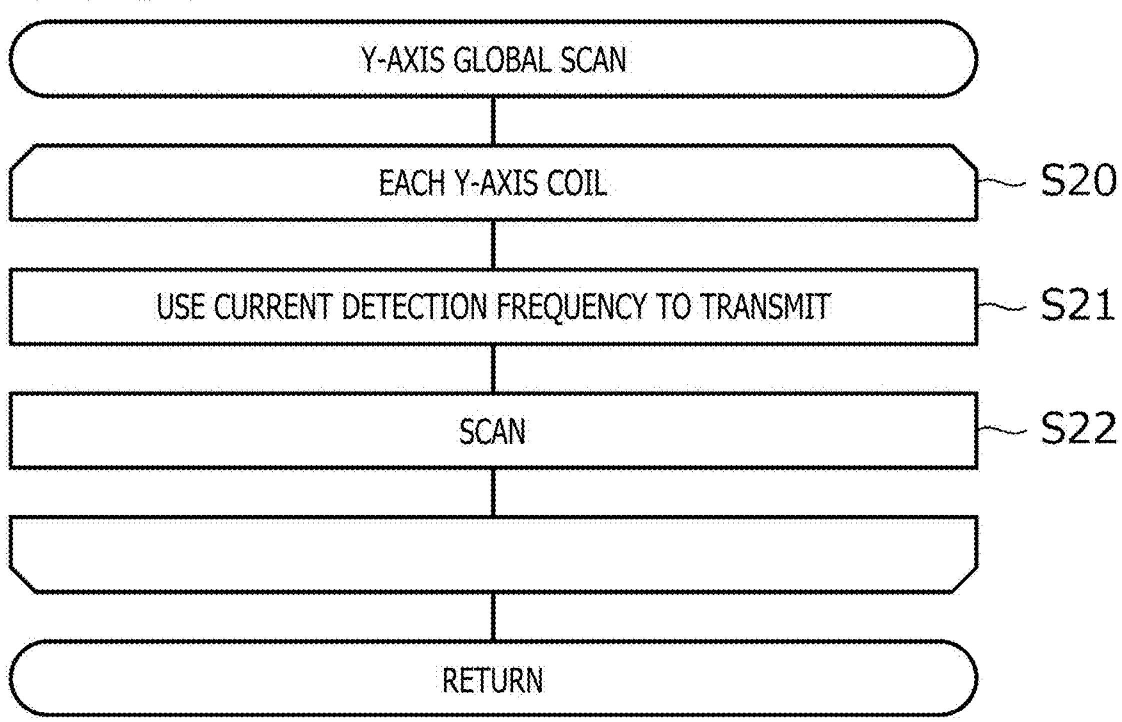
FIG. 6A is a process flow chart illustrating details of a Y-axis global scan performed at S2 of FIGS. 4, 11, and 13.

FIG. 6A is a process flow chart illustrating details of the Y-axis global scan performed at S2. The controller 28 is configured to select the Y-axis loop coils LC one by one (specifically, use the selection circuit 21 illustrated in FIG. 2 to connect the Y-axis loop coils LC one by one to the common terminal of the switch circuit 22) and repeat the process of S21 and S22 (S20).

S21 is a process of connecting the switch circuit 22 illustrated in FIG. 2 to the oscillator 29 side to use a current detection frequency to transmit a predetermined detection signal from a current loop coil LC (Y-axis loop coil LC) for a predetermined time period. If a position indicator 2 in which the current detection frequency is the resonant frequency exists near the current loop coil LC, the capacitor 4 illustrated in FIG. 2 is charged during S21.

S22 is a process of connecting the switch circuit 22 illustrated in FIG. 2 to the detection circuit 24 side after the completion of the transmission of the detection signal to thereby perform a scan of the current loop coil LC (Y-axis loop coil LC). The scan here is a process of detecting the reception strength (resonant level) of the reflected signal transmitted by the position indicator 2. The controller 28 temporarily stores the detected resonant level of each Y-axis loop coil LC.

FIG. 13 will be further described. Once the Y-axis global scan is finished, the controller 28 determines whether there is a resonant level equal to or greater than a threshold among the plurality of temporarily stored resonant levels (S3). As a result of the determination, if the controller 28 determines "no," the controller 28 switches the detection frequency to the next one (the resonant frequency for the position indicator 2*b* if the current detection frequency is the resonant frequency for the position indicator 2*a*, the resonant frequency for the position indicator 2*a* if the current detection frequency is the resonant frequency for the position indicator 2*b*) (S4) and returns the process to S2. S4 is provided to alternately repeat the detection of the position of the position indicator 2*a* through the Y-axis global scan and the detection of the position of the position indicator 2*b* through the Y-axis global scan in the global scan mode.

On the other hand, if the controller 28 determines "yes" at S3, the controller 28 enters into the intermediate mode (S5) and determines the Y-axis loop coil LC (hereinafter, referred to as a "closest Y-axis loop coil LC") closest from the position indicator 2 based on the plurality of resonant levels temporarily stored at S2 (S6). The controller 28 then performs the X-axis global scan of the position indicator 2 (S7).

Figure 6B:
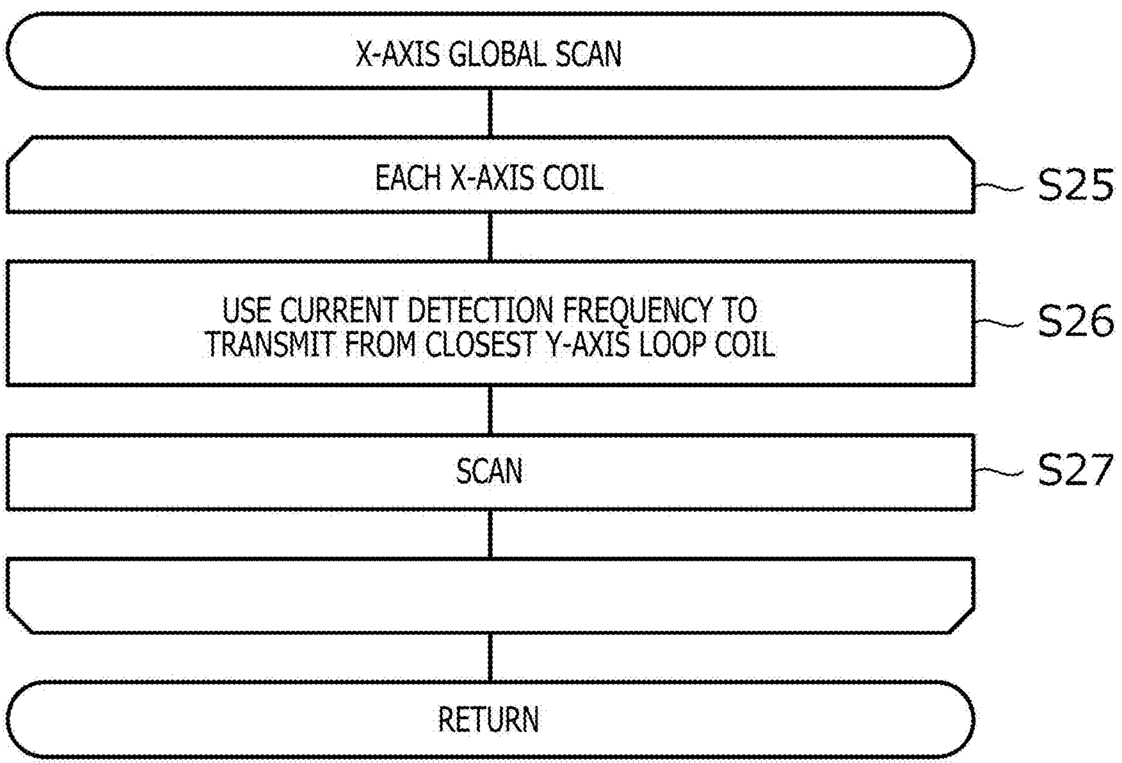
FIG. 6B is a process flow chart illustrating details of a Y-axis global scan performed at S7 of FIGS. 4, 11, and 13.

FIG. 6B is a process flow chart illustrating details of the X-axis global scan performed at S7. The controller 28 is configured to select the X-axis loop coils LC one by one (specifically, use the selection circuit 21 illustrated in FIG. 2 to connect the X-axis loop coils LC one by one to the common terminal of the switch circuit 22) and repeat the process of S26 and S27 (S25).

S26 is a process of connecting the switch circuit 22 illustrated in FIG. 2 to the oscillator 29 side to use the current detection frequency to transmit a predetermined detection signal from the closest Y-axis loop coil LC for a predetermined time period. At this point, it is highly probable that the position indicator 2 in which the current detection frequency is the resonant frequency exists near the closest Y-axis loop coil LC. Therefore, the capacitor 4 of the position indicator 2 is charged during S26.

S27 is a process of connecting the switch circuit 22 illustrated in FIG. 2 to the detection circuit 24 side after the completion of the transmission of the detection signal to thereby perform a scan of the current loop coil LC (X-axis loop coil LC). The scan here is also a process of detecting the reception strength (resonant level) of the reflected signal transmitted by the position indicator 2. The controller 28 temporarily stores the detected resonant level of each X-axis loop coil LC.

Figure 8:
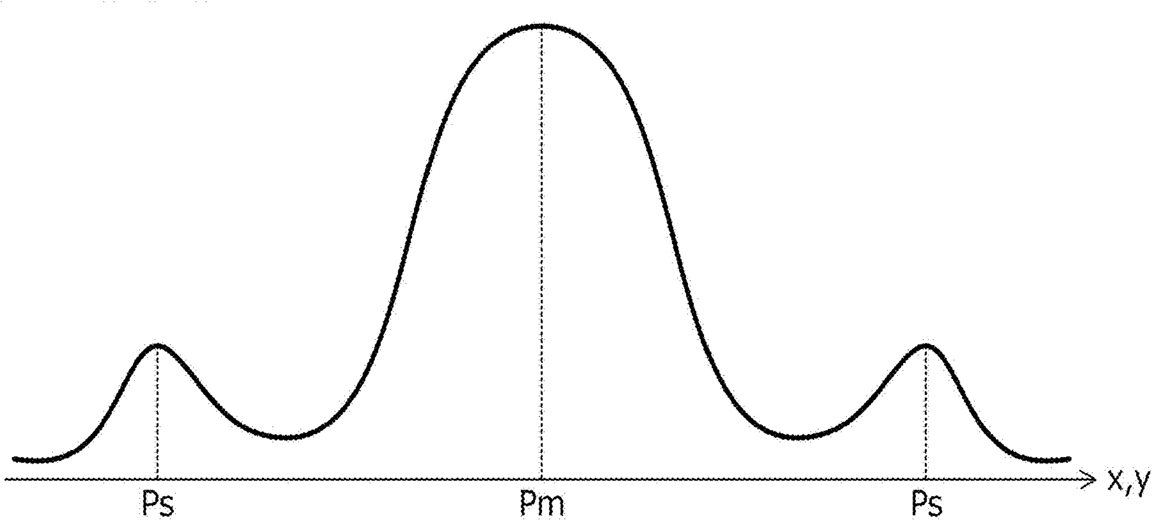
FIG. 8 schematically depicts a resonant level detected at S2 and S7 of FIGS. 11 and 13.

FIG. 13 will be further described. Once the X-axis global scan is finished, the controller 28 performs a determination process for confirming the detection of the position in response to processing results of S2 and S7 (S8). The determination process includes a process of determining whether there is a resonant level equal to or greater than a threshold among the plurality of temporarily stored resonant levels in relation to the X-axis loop coils LC as at S3 and also includes a process of determining whether the distribution of the resonant levels has a predetermined shape (for example, an arched shape as illustrated in FIG. 8 described later), a process of checking that the phase difference in electromagnetic resonance does not indicate sidelobes, a process of determining whether the ratio of the resonant level of the sidelobes to the resonant level of the main peak indicates a normal value, etc. The local scan may be attempted once, and whether the position indicator 2 is detected as a result of the local scan may also be determined.

FIG. 8 schematically depicts the resonant levels detected at S2 and S7. The horizontal axis in FIG. 8 represents the x-axis or the y-axis, and the vertical axis represents the resonant levels. As illustrated in FIG. 8, the resonant levels detected at S2 and S7 include a relatively large peak (main peak) appearing at an illustrated position Pm and relatively small peaks (sidelobes) appearing at both sides (illustrated positions Ps) of the large peak. The sidelobes are generated because the electromagnetic force generated from the sensor 10 is ring-shaped, and the position indicator 2 does not exist at the positions of the sidelobes.

FIG. 13 will be further described. The process of S8 is, in short, a process of checking whether the waveform as illustrated in FIG. 8 is correctly obtained and whether the position to be detected is the position Pm. The position Pm is also determined as the position of the position indicator 2 at S8.

If the detection of the position indicator 2 is not confirmed as a result of the performance of the determination process at S8, the controller 28 returns the process to S1 and enters into the global scan mode again. On the other hand, if the detection of the position indicator 2 is confirmed, the controller 28 enters into the local scan mode (S10) and starts the local scan of the position indicator 2 (S11). The resonant frequency (assigned frequency) used for the local scan in this case is the current detection frequency.

Figure 7A:
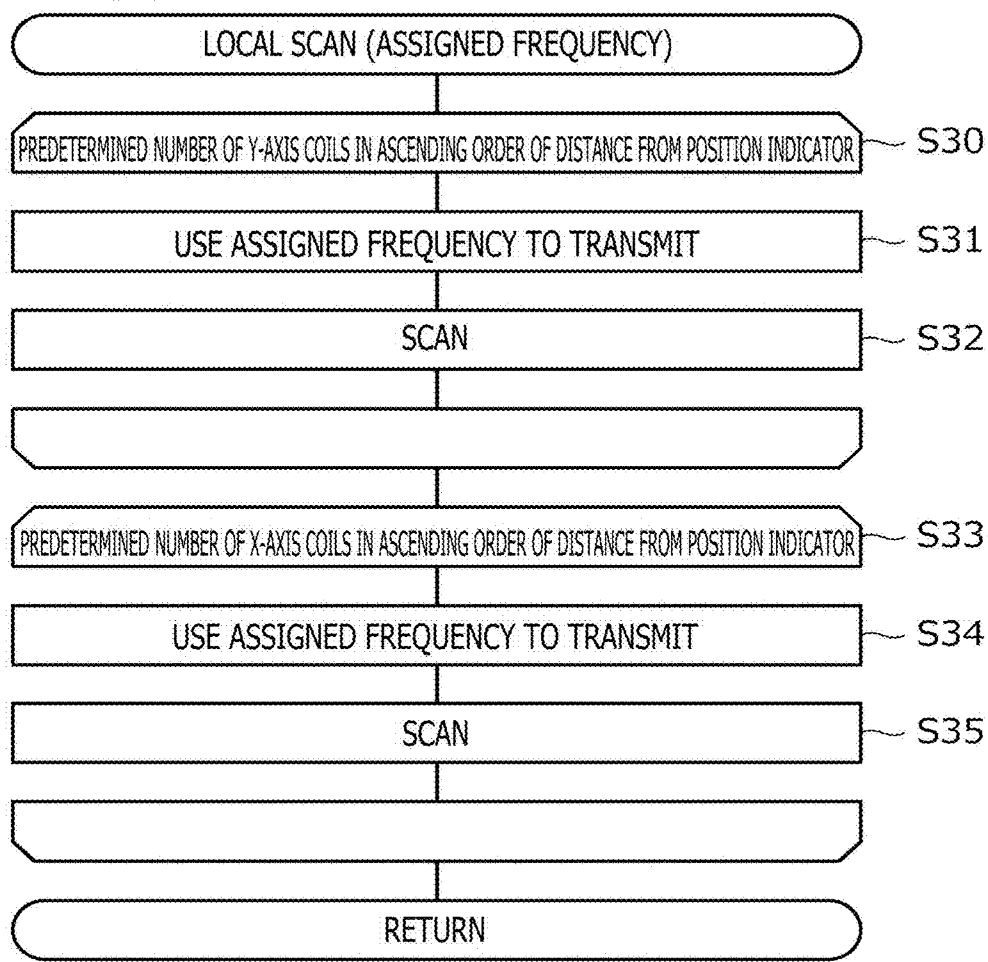
FIG. 7A is a process flow chart illustrating details of a local scan performed at S11 of FIGS. 5, 12, and 13.

FIG. 7A is a process flow chart illustrating details of the local scan performed at S11. The controller 28 is configured to select a predetermined number (for example, three or four) of Y-axis loop coils LC one by one (specifically, use the selection circuit 21 illustrated in FIG. 2 to connect the Y-axis loop coils LC one by one to the common terminal of the switch circuit 22) in ascending order of distance from the position of the target position indicator 2 (determined at S8 just after the shift from the intermediate mode and determined by the most recent local scan in the second and subsequent local scans) and repeat the process of S31 and S32 (S30).

S31 is a process of connecting the switch circuit 22 illustrated in FIG. 2 to the oscillator 29 side to thereby use the assigned frequency to transmit a predetermined detection signal from the current loop coil LC (Y-axis loop coil LC) for a predetermined time period. S32 is a process of connecting the switch circuit 22 illustrated in FIG. 2 to the detection circuit 24 side after the completion of the transmission of the detection signal to thereby perform the scan of the current loop coil LC. The controller 28 temporarily stores the detected resonant level of each of the selected loop coils LC.

Next, the controller 28 is configured to select a predetermined number (for example, three or four) of X-axis loop coils LC one by one (specifically, use the selection circuit 21 illustrated in FIG. 2 to connect the X-axis loop coils LC one by one to the common terminal of the switch circuit 22) in ascending order of distance from the position of the target position indicator 2 and repeat the process of S34 and S35 (S33).

S34 is a process of connecting the switch circuit 22 illustrated in FIG. 2 to the oscillator 29 side to thereby use the assigned frequency to transmit a predetermined detection signal from the current loop coil LC (X-axis loop coil LC) for a predetermined time period. S35 is a process of connecting the switch circuit 22 illustrated in FIG. 2 to the detection circuit 24 side after the completion of the transmission of the detection signal to thereby perform the scan of the current loop coil LC. The controller 28 temporarily stores the detected resonant level of each of the selected loop coils LC.

Although the predetermined detection signal is transmitted from the current loop coil LC at S34, the closest Y-axis loop coil LC closest from the position indicator 2 may be determined based on the result of S30 to transmit the detection signal from the closest Y-axis loop coil LC as in the case of the global scan. Although FIG. 7A illustrates an example of performing S33 to S35 after S30 to S32, the order may be the opposite.

FIG. 13 will be further described. After the end of the process of S11, the controller 28 determines whether the reflected signal is lost (S12). The state in which the reflected signal is lost denotes a case in which a sufficient resonant level is not detected as a result of scanning the loop coils. For example, the state corresponds to a case in which the target position indicator 2 gets away from the input surface 10*a*. In this case, the controller 28 returns the process to S1 and enters into the global scan mode again. On the other hand, if the controller 28 determines that the reflected signal is not lost at S12, the controller 28 determines the position of the position indicator 2 based on the plurality of resonant levels temporarily stored at S11 and supplies coordinates indicating the determined position to the host processor 40 illustrated in FIG. 1 (S13). The controller 28 then returns the process to S11 and performs the local scan again.

In the position detection process, there may be two states described below. Each state will now be described.

The first state is that the position indicator 2*a* with pen function cannot be detected after the shift to the local scan mode for the position indicator 2*b* with eraser function. For example, there may be a state in which the user leaves the position indicator 2*b* with eraser function on the input surface 10*a* and uses the position indicator 2*a* with pen function to perform an input. Therefore, in this state, it is necessary to be able to detect the position indicator 2*a* with pen function even after the shift to the local scan for the position indicator 2*b* with eraser function.

The second state is that there is a case in which although the process advances to S9 for the position indicator 2*a* as a priority position indicator, a negative determination is made at S9, so that the process cannot advance to the local scan. When this state continues, the position indicator 2*a* enters into the global scan mode again, and then the position indicator 2*a* as a priority position indicator is detected. Therefore, the Y-axis global scan of the non-priority position indicator is not performed, and as a result, the position indicator 2*b* as a non-priority position indicator cannot be detected. This state occurs because the detection frequency is initialized at S1 every time S9 is denied. The state may occur when, for example, the position indicator 2*a* with pen function is laid down and left on the input surface 10*a*, and a correct waveform cannot be obtained in the determination process of S8. Therefore, while realizing a quick global scan by adopting the global scan mode and the intermediate mode, the situation where the position indicator 2*b* as a non-priority position indicator cannot be detected needs to be prevented.

Figure 4:
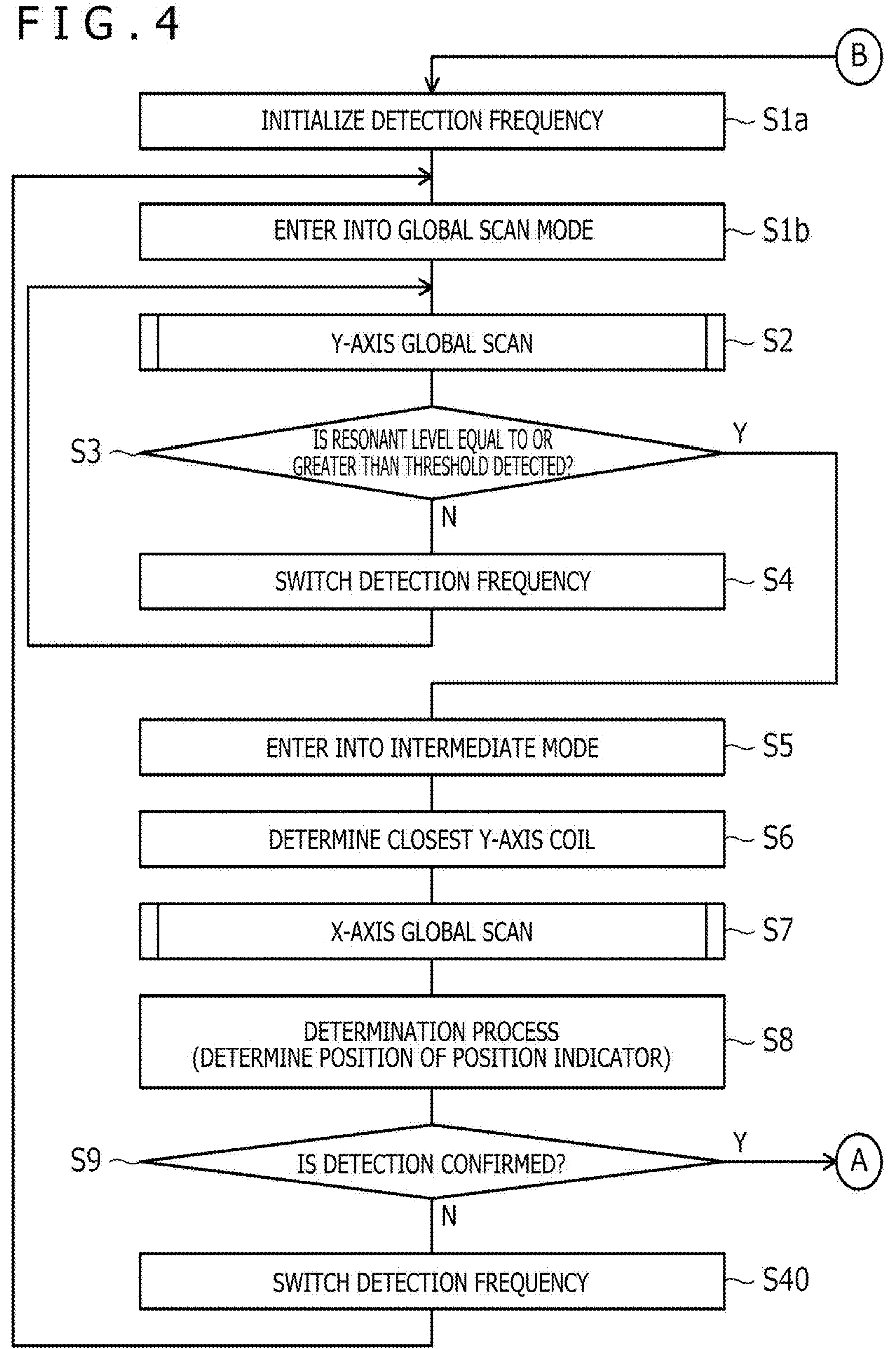
FIG. 4 is a process flow chart illustrating a position detection process according to the first embodiment of the present disclosure.
Figure 5:
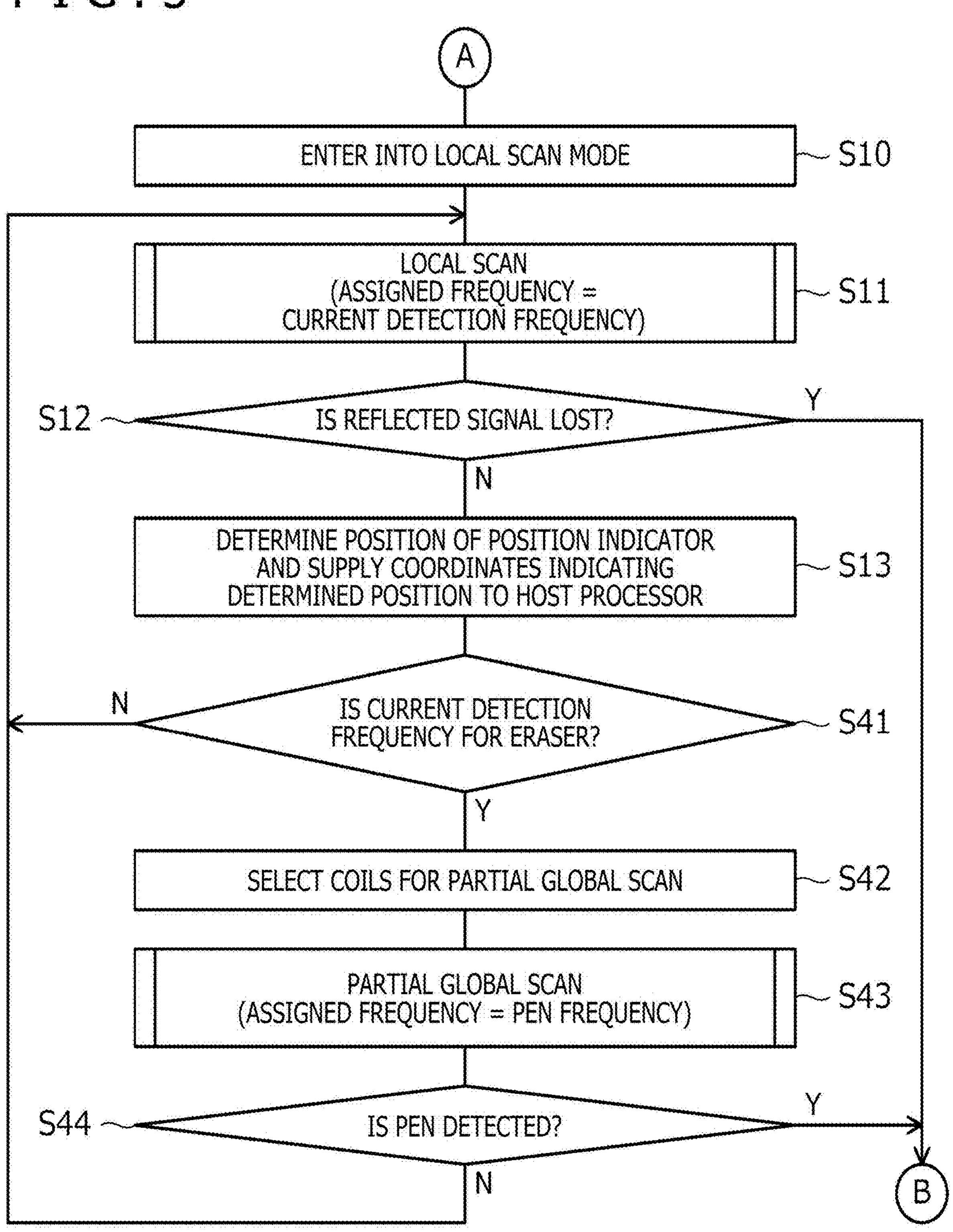
FIG. 5 is a process flow chart illustrating a position detection process according to the first embodiment of the present disclosure.

FIGS. 4 and 5 depict a process flow chart illustrating a position detection process performed by the controller 28 to prevent the state described above. The method of position detection performed by the controller 28 according to the present embodiment will now be described in detail with reference to the drawings.

The method illustrated in FIGS. 4 and 5 is different from the method illustrated in FIG. 13 in that S1 is divided into S1*a* and S1*b*, the process moves to S40 instead of S1 when the determination result of S9 is negative, and S41 to S44 are performed after S13. The differences will be mainly described.

The controller 28 divides S1 into S1*a* and S1*b* and performs S1*a* and S1*b* as illustrated in FIG. 4. S1*a* is a process of initializing the detection frequency, and S1*b* is a process of entering into the global scan mode.

Also, the controller 28 moves to S40 instead of S1 when the determination result of S9 is negative as illustrated in FIG. 4. S40 is a process of switching the detection frequency to the next one as at S4. After executing S40, the controller 28 performs S1*b*. In this way, the controller 28 enters into the global scan mode again without initializing the detection frequency. Therefore, when the position of the position indicator 2*a* is not confirmed at S9 so that the controller 28 shifts to the global scan mode, the controller 28 performs the Y-axis global scan of the position indicator 2*b* first. This can prevent the situation where the position indicator 2*b* as a non-priority position indicator cannot be detected, while realizing the quick global scan by adopting the global scan mode and the intermediate mode.

The controller 28 further performs S41 to S44 after S13 as illustrated in FIG. 5. More specifically, the controller 28 first determines whether the current detection frequency is the resonant frequency of the position indicator 2*b* with eraser function (S41). As a result, if the controller 28 determines that the current detection frequency is not the resonant frequency of the position indicator 2*b* with eraser function, the controller 28 returns the process to S11 and continues the local scan of the position indicator 2*a*. On the other hand, if the controller 28 determines that the current detection frequency is the resonant frequency of the position indicator 2*b* with eraser function, the controller 28 selects the loop coils LC (partial global scan coils) to be used in the partial global scan (S42) and then performs the partial global scan of the position indicator 2*a* (S43). At S42, the controller 28 may, for example, sequentially select a plurality of loop coils LC including one or both of Y-axis loop coils LC and X-axis loop coils LC or may select a plurality of loop coils LC in another order. The resonant frequency (assigned frequency) used in the partial global scan of S43 is the resonant frequency (pen frequency) of the position indicator 2*a*.

Figure 7B:
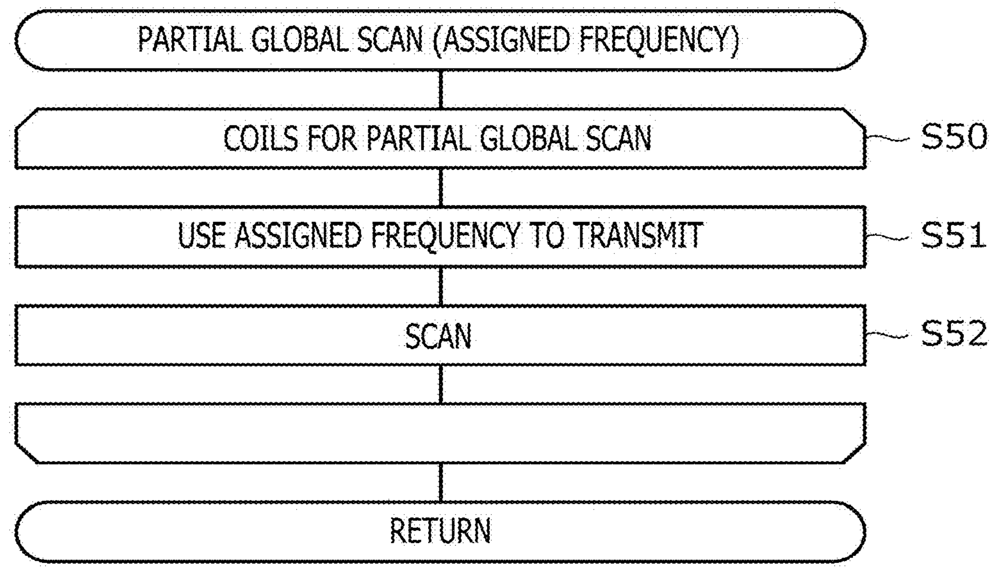
FIG. 7B is a process flow chart illustrating details of a partial global scan performed at S43 of FIG. 5 and S64 of FIG. 12.

FIG. 7B is a process flow chart illustrating details of the partial global scan performed by the controller 28 at S43. As illustrated in FIG. 7B, the controller 28 is configured to select the loop coils LC for partial global scan (loop coils LC selected at S42 of FIG. 5) one by one (specifically, use the selection circuit 21 illustrated in FIG. 2 to connect the loop coils LC one by one to the common terminal of the switch circuit 22) and repeat the process of S51 and S52 (S50).

S51 is a process of connecting the switch circuit 22 illustrated in FIG. 2 to the oscillator 29 side to thereby use the assigned frequency to transmit a predetermined detection signal from the current loop coil LC for a predetermined time period. S52 is a process of connecting the switch circuit 22 illustrated in FIG. 2 to the detection circuit 24 side after the completion of the transmission of the detection signal to thereby scan the current loop coil LC. The controller 28 temporarily stores the detected resonant level of each of the selected loop coils LC.

FIG. 5 will be further described. After executing the partial global scan, the controller 28 determines whether the position indicator 2*a* is detected based on whether the reflected signal from the position indicator 2*a* is detected (S44). If the controller 28 determines that the position indicator 2*a* is "detected", the controller 28 returns the process to Sla to halt the local scan of the position indicator 2*b* and enter into the global scan mode again. As a result, although the process is started over from the Y-axis global scan, the reflected signal from the position indicator 2*a* is detected. Therefore, the controller 28 shifts to the local mode for the position indicator 2*a*, and the user can use the position indicator 2*a* with pen function to perform an input. On the other hand, if the controller 28 determines that the position indicator 2*a* is "not detected" at S44, the controller 28 returns the process to S11. As a result, the local scan mode of the position indicator 2*b* continues, and the user can continue to use the position indicator 2*b* with eraser function to perform an input.

As described above, according to the position detection apparatus 1 and the position detection process of the present embodiment, the detection of the position indicated by the position indicator 2*a* continues even after the detection of the position indicated by the position indicator 2*b*. Therefore, the position indicated by the position indicator 2*b* can be detected, and the position indicated by the position indicator 2*a* can be detected. This allows the user to use the position indicator 2*a* with pen function to perform an input without moving the position indicator 2*b* with eraser function from the input surface 10*a*.

Although the partial global scan of the position indicator 2*a* is performed in the local scan mode for the position indicator 2*b* in the case described in the present embodiment, it is obvious that the partial global scan of the position indicator 2*b* may be performed in the local scan mode for the position indicator 2*a*. This allows the user to use the position indicator 2*b* with eraser function to perform an input without moving the position indicator 2*a* with pen function from the input surface 10*a*.

According to the position detection apparatus 1 and the position detection process of the present embodiment, the Y-axis global scan of the position indicator 2*b* is performed first in the case where the controller 28 shifts to the global scan mode when the detection of the position of the position indicator 2*a* is not confirmed in the determination process after the end of the X-axis global scan. This can prevent the situation where the position indicator 2*b* as a non-priority position indicator cannot be detected, while realizing the quick global scan by setting the global scan mode and the intermediate mode.

Although the position detection apparatus 1 described in the present embodiment has both of the configuration for detecting the position indicator 2*a* after the shift to the local scan mode for the position indicator 2*b* (for example, S41 to S44) and the configuration for preventing the situation where the position indicator 2*b* as a non-priority position indicator cannot be detected while realizing the quick global scan by setting the global scan mode and the intermediate mode (for example, S1*a*, S1*b*, and S40), the present disclosure also includes a position detection apparatus with one of the configurations.

Next, the position detection apparatus 1 and the position detection process according to a second embodiment of the present disclosure will be described.

Figure 9:
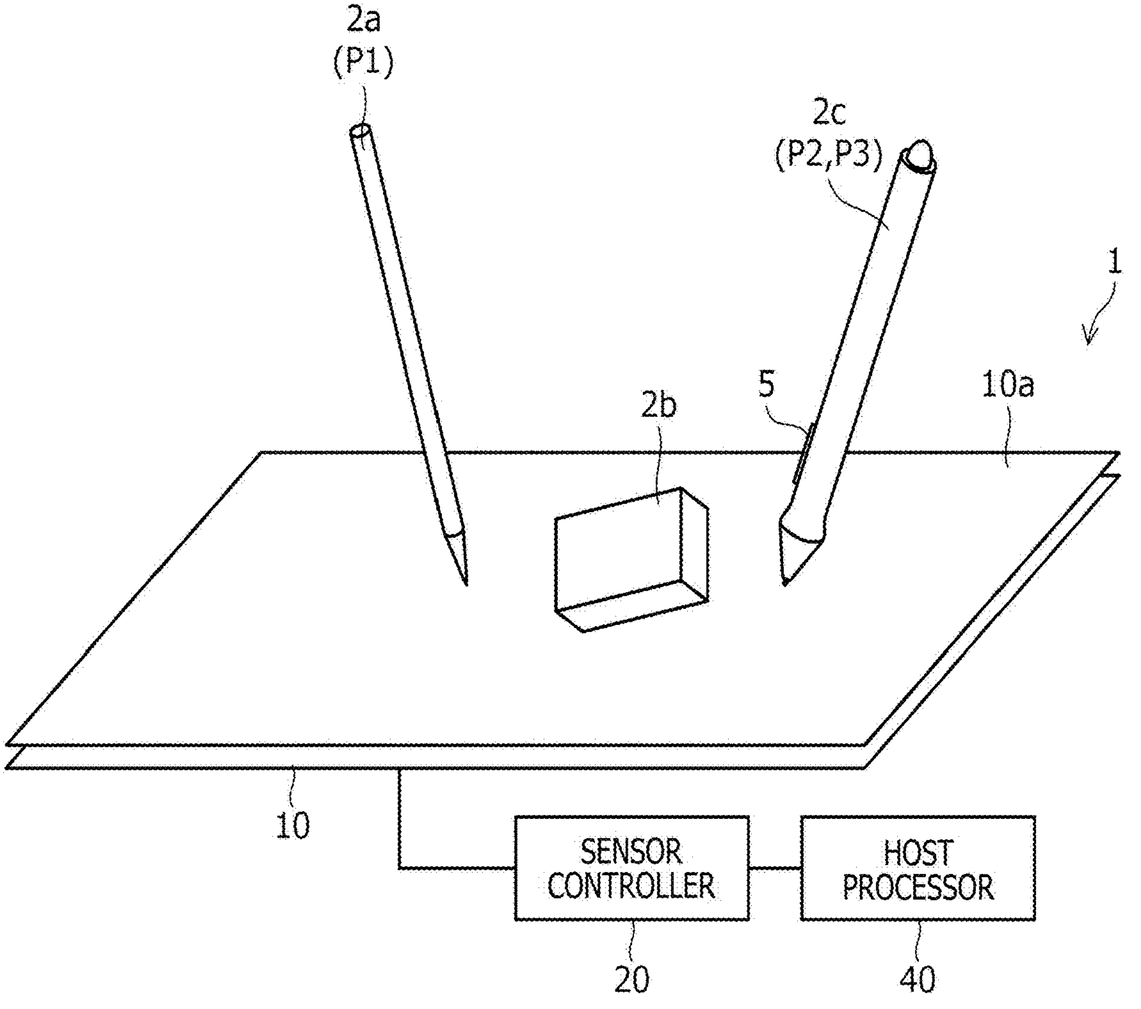
FIG. 9 depicts an appearance of the position detection apparatus and position indicators according to a second embodiment of the present disclosure.

FIG. 9 depicts an appearance of the position detection apparatus 1 and the position indicators 2*a* to 2*c* according to the second embodiment of the present disclosure. Although the basic configuration of the position detection apparatus 1 is the same as the position detection apparatus 1 according to the first embodiment, the position detection apparatus 1 is different from the position detection apparatus 1 according to the first embodiment in that the position detection apparatus 1 also corresponds to the detection of the position indicator 2*c*. Although the basic structure of the position indicator 2*c* is similar to the position indicator 2*a*, the position indicator 2*c* is different from the position indicator 2*a* in that the position indicator 2*c* includes a side switch 5, and the resonant frequency varies depending on whether or not the side switch 5 is pressed. Hereinafter, the position indicator 2*a* will be referred to as a pen 1 (P1), the position indicator 2*c* with the side switch 5 not pressed will be referred to as a pen 2 (P2), and the position indicator 2*c* with the side switch 5 pressed will be referred to as a pen 3 (P3) in some cases. The position indicator 2*b* as an eraser will be simply called an eraser in some case.

Figure 10A:
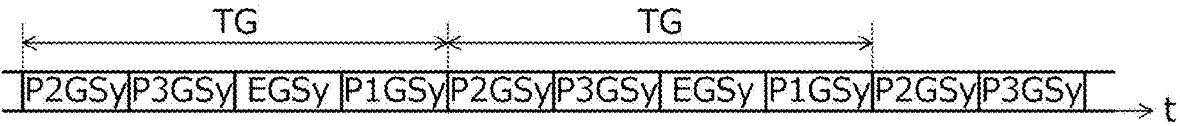
FIGS. 10A and 10B depict an outline of a position detection process carried out by a controller according to the second embodiment of the present disclosure.
Figure 10B:
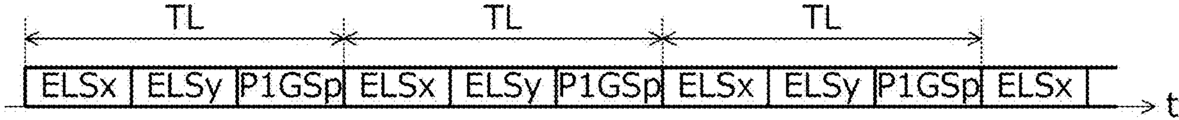

FIGS. 10A and 10B depict an outline of the position detection process carried out by the controller 28 according to the present embodiment. FIG. 10A illustrates a global scan mode of performing a global scan for scanning the entire sensor 10 to detect the position of each position indicator 2, and FIG. 10B illustrates a local scan mode of performing a local scan for scanning a neighborhood area of the detected position in the sensor 10. FIG. 10B illustrates a local scan mode for the position indicator 2*b* as an eraser, which will be described in detail later. Although not illustrated in FIGS. 10A and 10B, there is an intermediate mode for confirming the position detected in the global scan mode between the global scan mode and the local scan mode as in the first embodiment.

One of the differences from the position detection process illustrated in FIGS. 3A and 3B is that the controller 28 in the global scan mode performs four types of Y-axis global scans in a time-division manner. Specifically, the Y-axis global scans are performed in the order of pen 2 (P2GSy), pen 3 (P3GSy), eraser (EGSy), and pen 1 (P1GSy). Note that four types of Y-axis global scans are performed in a time-division manner, and therefore, the time length of the time period TG is twice the time length of the time period TG in the first embodiment.

As illustrated in FIG. 10B, the local scan of the position indicator 2*b* and the partial global scan of the position indicator 2*a* (first partial global scan) are also alternately performed in the local scan mode for the position indicator 2*b* as an eraser in the present embodiment. Note that "P1GSp" illustrated in FIG. 10B represents a partial global scan of the pen 1.

The point of the present embodiment is that the order of the Y-axis global scans of the position indicator 2*a* and the position indicator 2*b* in the global scan mode is opposite the order in the first embodiment. That is, the pen 1 as a target of the partial global scan is a position indicator not prioritized over the eraser as a target of the local scan in the present embodiment. Due to the difference from the first embodiment, the mode needs to be shifted once to the global scan mode in the present embodiment to confirm the detection even when the pen 1 is detected in the partial global scan. However, after the shift to the global scan mode, the eraser as a priority position indicator prioritized over the pen 1 is detected again. As a result, the mode cannot be shifted to the local scan mode for the pen 1 even though the pen 1 as a non-priority position indicator is detected in the partial global scan. Therefore, the mode needs to be able to shift to the local scan mode for the pen 1 when the pen 1 is detected in the partial global scan.

Figure 11:
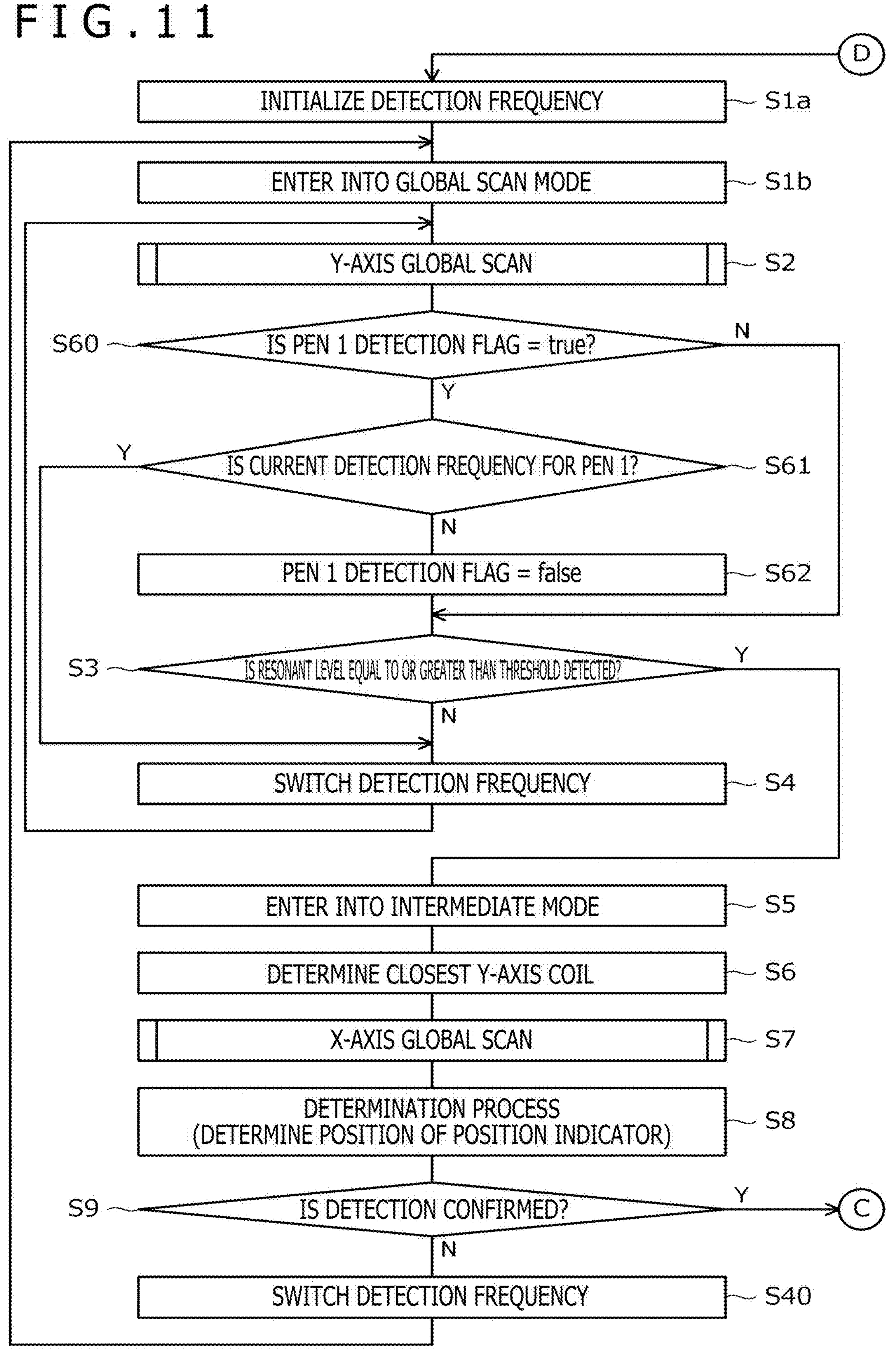
FIG. 11 is a process flow chart illustrating a position detection process according to the second embodiment of the present disclosure.
Figure 12:
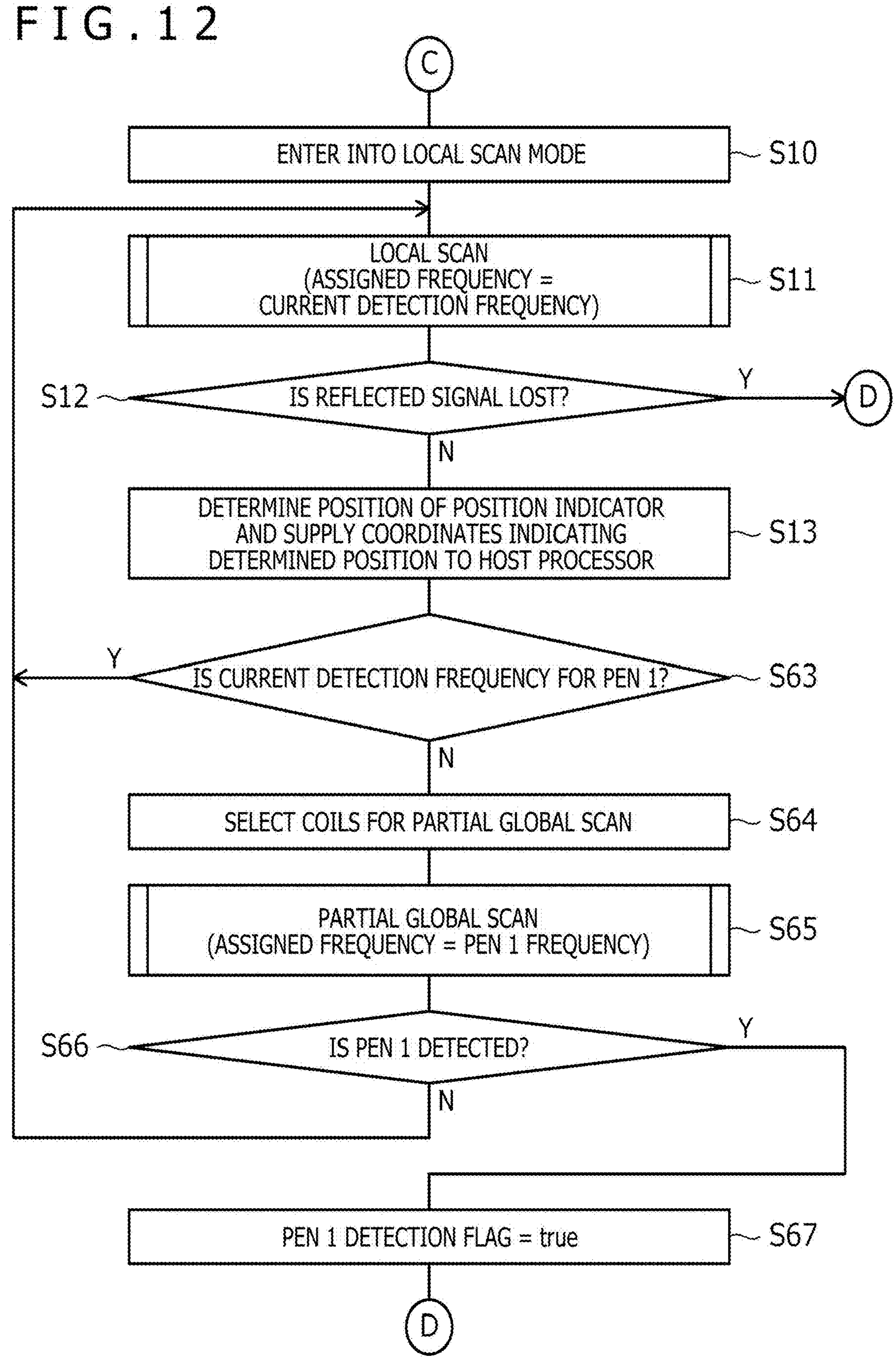
FIG. 12 is a process flow chart illustrating a position detection process according to the second embodiment of the present disclosure.

FIGS. 11 and 12 depict a process flow chart illustrating a position detection process performed by the controller 28 to prevent such a state. The method of position detection performed by the controller 28 according to the present embodiment will now be described in detail with reference to FIGS. 11 and 12.

The method illustrated in FIGS. 11 and 12 is different from the method illustrated in FIGS. 4 and 5 in that S60 to S62 are inserted between S2 and S3, and S63 to S67 are adopted in place of S41 to S44. The differences will be mainly described.

With reference to FIG. 12, the controller 28 first determines whether the current detection frequency is for the pen 1 (that is, resonant frequency of the position indicator 2*a*) after performing S13 (S63). As a result, if the controller 28 determines that the current detection frequency is for the pen 1, the controller 28 returns the process to S11 and continues the local scan of the pen 1. On the other hand, if the controller 28 determines that the current detection frequency is not for the pen 1, the controller 28 selects the partial global scan coils as at S42 illustrated in FIG. 5 (S64) and performs the partial global scan similar to S43 illustrated in FIG. 5 (S65). Note that the resonant frequency (assigned frequency) used in the partial global scan of S65 is the resonant frequency (pen 1 frequency) of the pen 1.

The controller 28 that has performed the partial global scan determines whether the pen 1 is detected based on whether the reflected signal from the pen 1 is detected (S66). The controller 28 that has determined that the reflected signal is "not detected" returns the process to S11. In this way, the local scan mode of the eraser continues, and the user can continue to use the eraser to perform an input. On the other hand, if the controller 28 determines that the reflected signal is "detected" at S66, the controller 28 sets a pen 1 detection flag to "True" (S67). The controller 28 then returns the process to S1*a* to initialize the detection frequency (S1*a*) and enter into the global scan mode again (S1*b*). In this way, the Y-axis global scan of S2 is performed in the order of the pen 2, the pen 3, the eraser, and the pen 1.

Here, the controller 28 in the process of FIG. 11 performs a process of determining whether the pen 1 detection flag is "True" after the end of S2 (S60). If the controller 28 determines that the pen 1 detection flag is "True" at S60, the controller 28 further performs a process of determining whether the current detection frequency is for the pen 1 (S61). The controller 28 that has obtained a positive determination result at S61 skips S3 and advances the process to S4. As a result, each process of the intermediate mode including the determination process of S8 is skipped. Even if the position of the pen 2, the pen 3, or the eraser is detected at S2, the position is not eventually detected, and the next Y-axis global scan for the position indicator 2 is performed. The determination result of S61 is positive when the Y-axis global scan for the pen 1 is performed. Therefore, S3 is performed in this case, and the process can advance to the intermediate mode. Therefore, the mode can be switched to the local scan mode for the pen 1 when the pen 1 is detected in the partial global scan.

Note that the controller 28 that has determined "False" at S60 skips the process of S61 and S62 and advances the process to S3. In this way, the mode can be shifted to the intermediate mode as usual regardless of the type of position indicator 2 when the pen 1 is not detected in the partial global scan. The controller 28 that has obtained a negative determination result at S61 performs a process of setting the pen 1 detection flag to "False" (S62) and advances the process to S3. In this way, the determination result of S60 can be fixed to "False" until the next partial global scan for the pen 1 is performed.

As described above, according to the position detection apparatus 1 and the position detection process of the present embodiment, the position of the pen 2, the pen 3, or the eraser is not detected when the mode shifts to the global scan mode after the detection of the position of the pen 1 as a result of the partial global scan. The position of the pen 1 can be detected even through the pen 1 is a non-priority position indicator. Therefore, the pen 1 as a non-priority position indicator can be shifted to the local scan mode in the partial global scan.

Although the preferred embodiments of the present disclosure have been described, the present disclosure is not limited to the embodiments in any way, and it is obvious that the present disclosure can be carried out in various modes without departing from the scope of the present disclosure.

For example, in the present embodiments, although the position indicator 2*a* with pen function and the position indicator 2*b* with eraser function are used to describe an example of the position detection process according to the present disclosure, the present disclosure can be widely applied to a plurality of position indicators with functions different from each other.

Although the shape of the position indicator 2*a* with pen function is a pen shape, and the shape of the position indicator 2*b* with eraser function is an eraser shape in the description of the present embodiments, switches for switching the pen function and the eraser function can be provided in position indicators, and the switches can be controlled to realize the pen function and the eraser function in the position indicators with the same shape.

In the example of the present embodiment, the global scan is carried out by performing the Y-axis global scan, followed by the X-axis global scan (see FIG. 4 and the like). The local scan is carried out by performing the X-axis local scan, followed by the Y-axis local scan (see FIG. 7A). However, the present disclosure can also be favorably applied when one or both of the orders are changed.

It is to be noted that the embodiment of the present disclosure is not limited to the foregoing embodiment, and that various changes can be made without departing from the spirit of the present disclosure.

What is claimed is:

1. A position detection method, comprising:
- detecting, via a sensor, a first position indicated by a first position indicator using a first frequency;
- detecting, via the sensor, a second position indicated by a second position indicator using a second frequency; and
- in response to a detection of one of the first position indicator or the second position indicator, performing a local scan to detect a third position in a vicinity of the first position indicated by the first position indicator or the second position indicated by the second position indicator detected by the detection of the one of the first position indicator or the second position indicator;
- after the local scan is performed, determining whether a frequency used in the local scan is the second frequency; and
- in response to determining that the frequency used in the local scan is not the second frequency, alternately performing the local scan and a position detection process using the second frequency.

2. The position detection method according to claim 1, wherein the position detection process performed using the second frequency is a partial global scan that is part of a global scan that scans all of the sensor, and wherein the method further comprises alternately performing the local scan and the partial global scan.

3. The position detection method according to claim 2, further comprising:
- performing a global scan when the second position indicator is detected by performing the partial global scan.

4. The position detection method according to claim 3, further comprising:
- determining whether the global scan was performed in response to detecting the second position indicator by performing the partial global scan when the global scan is performed, and
- in response to determining that the global scan was performed in response to detecting the second position indicator by performing the partial global scan, restricting a transition to the local scan when the global scan is not performed at the second frequency.

5. The position detection method according to claim 1, further comprising:
- in response to determining that the frequency used in the local scan is the second frequency, performing the local scan again using the second frequency.

6. A position detection apparatus, comprising:
- a sensor; and
- a controller that, in operation, detects, via the sensor, a first position indicated by a first position indicator with a first frequency and a second position indicated by a second position indicator with a second frequency,
- wherein, in response to a detection of one of the first position indicator or the second position indicator, the controller switches to performing a local scan to detect a third position in a vicinity of the first position indicated by the first position indicator or the second position indicated by the second position indicator detected by the detection of one of the first position indicator or the second position indicator, and
- wherein, after the local scan is performed, the controller determines whether a frequency used in the local scan is the second frequency, and if the controller determines that the frequency used in the local scan is not the second frequency, the controller performs a position detection process using the second frequency.

7. The position detection apparatus according to claim 6, wherein the position detection process performed using the second frequency is a partial global scan that is part of a global scan that scans all of the sensor, and the controller alternately performs the local scan and the partial global scan.

8. The position detection apparatus according to claim 7, wherein the controller, in operation, performs the global scan when the second position indicator is detected by performing the partial global scan.

9. The position detection apparatus according to claim 8, wherein the controller, in operation, determines whether the global scan was performed in response to detecting the second position indicator by performing the partial global scan when the global scan is performed, and
- if the controller determines that the global scan was performed in response to detecting the second position indicator by performing the partial global scan, the controller restricts a transition to the local scan when the global scan is not performed at the second frequency.

10. The position detection apparatus according to claim 6, wherein, if the controller determines that the frequency used in the local scan is the second frequency, the controller performs the local scan again using the second frequency.

* * * * *